J. G. FAUST.
TRANSMISSION GEARING.
APPLICATION FILED OCT. 25, 1911.
1,144,184.
Patented June 22, 1915.
2 SHEETS—SHEET 1.
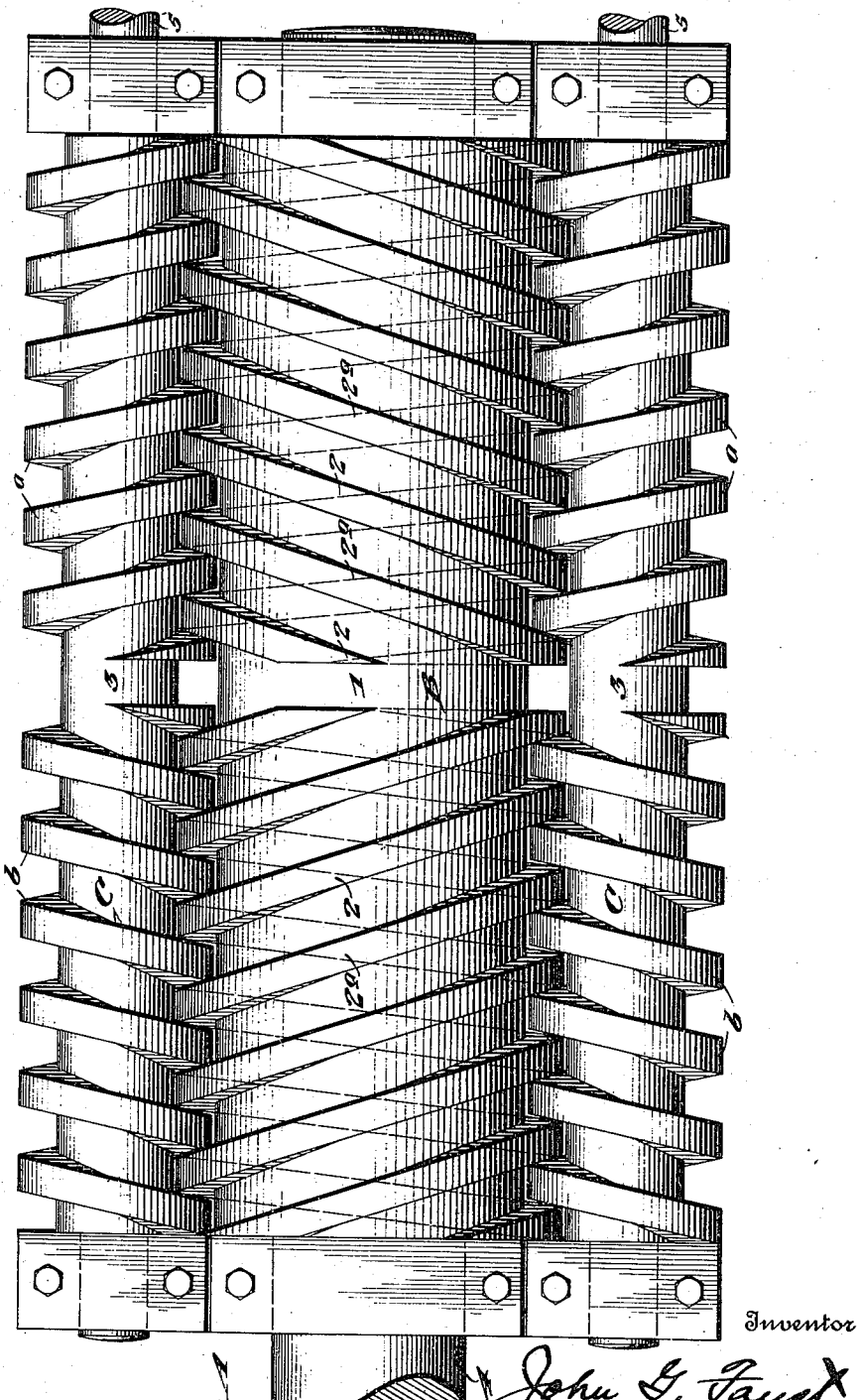

J. G. FAUST.
TRANSMISSION GEARING.
APPLICATION FILED OCT. 25, 1911.
1,144,184.
Patented June 22, 1915.
2 SHEETS—SHEET 2.
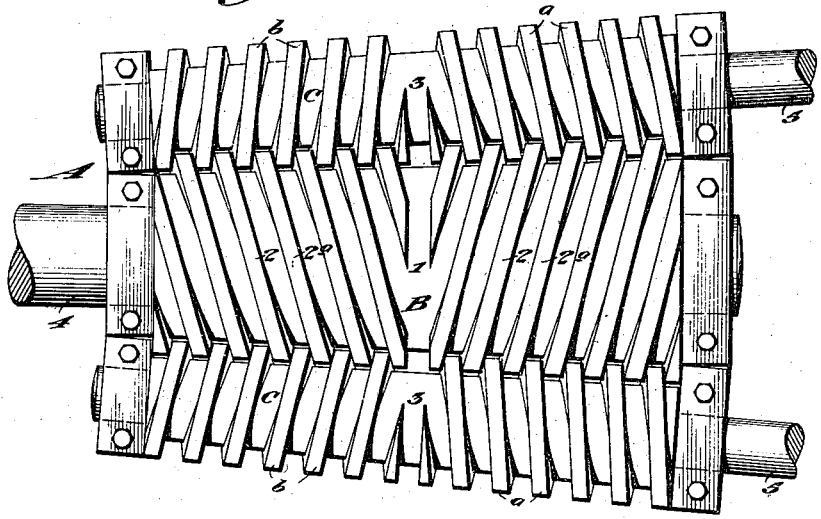
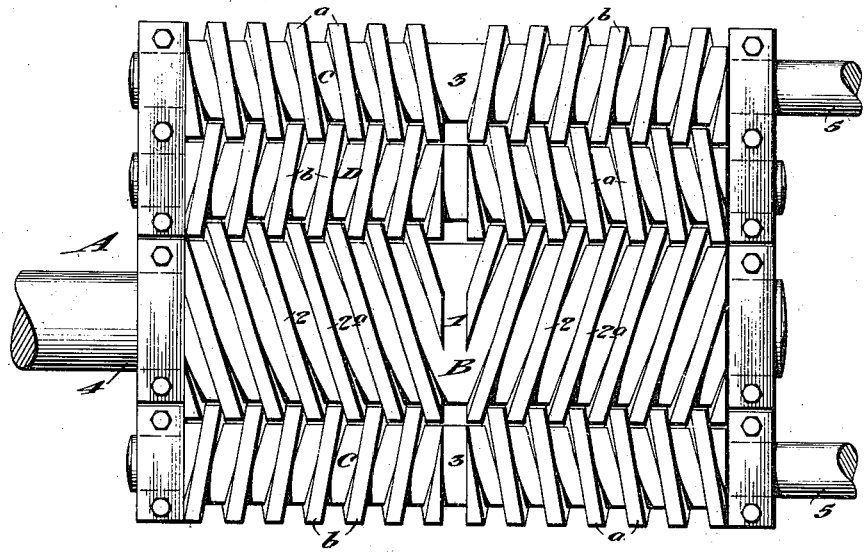

UNITED STATES PATENT OFFICE.

JOHN G. FAUST, OF BALTIMORE, MARYLAND, ASSIGNOR OF THIRTY-FIVE ONE-HUNDREDTHS TO HARRY C. MANNS, OF BALTIMORE, MARYLAND.

TRANSMISSION-GEARING.

1,144,184.  Specification of Letters Patent.  Patented June 22, 1915.

Application filed October 25, 1911. Serial No. 656,557.

*To all whom it may concern:*

Be it known that I, JOHN G. FAUST, a citizen of the United States, residing at Baltimore, State of Maryland, have invented certain new and useful Improvements in Transmission-Gearing, of which the following is a specification.

My invention relates to an improvement in transmission gearing, applicable to the machinery in the propelling of vessels, and the object is to provide a plurality of worm gears intermeshing, whereby a rotary movement is obtained without endwise pressure, and without producing a vertical, horizontal or diagonal movement.

A further object is to provide a gearing of this type in which the gears are made of varying sizes, thereby to increase or decrease the relative speeds at which the different shafts travel.

The invention consists in certain novel features of construction and combinations of parts which will be hereinafter described and pointed out in the claims.

In the accompanying drawings, Figure 1 is a view in top plan of my improved form; Fig. 2 is a similar view of a slightly modified form, showing the gears tapering; and Fig. 3 is another modified form showing an intermediate gear.

A, represents a frame of any suitable construction in which the gears are mounted.

B, represents the main gear, which in this instance is shown as being approximately twice the size of the small gears C, C, located on each side thereof, although it may be of any proportionate size, as hereinafter described. The small gears C, C, have central grooves 3, 3, cut in the outer surface, and on one side of this groove a right-hand worm thread $a$ is cut, and on the other a left-hand thread $b$ is formed. The main gear B has a central groove 1, and the right- and left- hand worm threads 2, 2, extend therefrom in much the same manner as upon the small gears, with the exception that that end which on the small gear is occupied by left-hand threads, is on the main gear cut with right-hand threads, and vice versa. The worm threads 2 on the main gear have a greater pitch than the threads on the small gears, and the additional worm threads $2^a$, $2^a$, are cut therebetween in such a manner that when the gear is completed it virtually has a pair of right-hand threads on one end and a pair of left-hand threads on the opposite end. By providing the main gear with two pairs of left- and right-hand threads, and placing the left-hand threads of the small gear in mesh with the right-hand threads of the main gear, and the right-hand threads of the small gear in mesh with the left-hand threads of the main gear, I have provided a structure in which the ratio of the threads is as one to two, or the same as the ratio of the diameters of the main and small gears, and as the small gears are revolving at twice the speed of the main gear, and the threads consequently travel with twice the longitudinal speed, it will be seen that the corresponding threads would come in proper mesh.

If it is desired to vary the relative speed between the main and small gears, the proportion must always be such that the diameter of the main gear will contain the diameter of the small gear a whole number of times when divided by it. As an example, if it is desired to make the speed of the main and small gear as one to five, it will be necessary to make the diameter of the main gear such that when divided by the diameter of the small gear the quotient will be five, and in this instance the main gear will have five times the number of threads on the small gear. In some cases, it might be desirable to place two threads on the small gear, but the number on the main gear would be correspondingly increased, or in the example cited, the main gear would contain ten threads.

As shown in Fig. 1, the main gear is connected to the driving shaft 4, and the smaller gears C are either connected or mounted upon the propeller shafts 5, 5. I do not wish to be limited to the manner of mounting the gears, for the reason that the power could be transmitted to one of the smaller gears, and propelling shafts connected to one of the smaller gears and the main gear.

In Fig. 2 the structure shown discloses all of the gears B and C as tapering in one direction, otherwise the idea is the same as shown in Fig. 1, and in Fig. 3 I have shown an intermediate gear D between the main gear and one of the smaller gears. With this structure, the propellers, of course, would travel in opposite directions, whereas in the structures shown in Figs. 1 and 2, the two propellers would travel in the same direction. It is evident that a number of small gears might be grouped around the main gear so that their centers would be at the points of a triangle or rectangle, and the operation would be the same.

The contact between the threads of the small gear and threads of the large gear is substantially a rolling contact and all pressure of the one set of threads against the other is in a direction parallel with the axis of rotation, either from the center on each side of the groove, or toward the center from each side thereof. If but a single small gear is used with the large gear, say for instance the driving gear B is mounted with but the lower driven gear C, each point of the thread of the small gear makes two contacts against the thread of the large gear to one contact of a point on the thread of the large gear. The pressure against the threads of the small gear is increased by reason of the fact that the driving gear is exerting a twisting force in the bearing of the drive shaft, and the threads of the small gear are caused to creep, or are rolled out, much after the method of spinning vessels from sheet-brass, aluminum and other metals. This causes the pitch of the threads to be changed as the creeping action increases with the greater length of thread traversed. By arranging a plurality of small gears so that they will be equally distributed around the periphery of the driving gear, the strain is removed from the driving shaft, and there is not the twisting action between the driving and the driven gears. Further, the rolling action is equal upon the threads of the large gear and the threads of each of the small gears. With the parts arranged in this manner, the threads will not have the tendency to creep, but if this tendency should be present the creeping action will take place in an equal manner upon every gear, and the pitches if changed will be changed in the same relation.

With this invention a rotary movement is obtained without any endwise pressure, and by providing the right- and left- hand threads on each gear, and having the right-hand threads mesh with left-hand threads of the adjacent gear, I am able to overcome any endwise pressure and at the same time overcome any vertical, horizontal and diagonal movement. This is accomplished to a great extent in having the threads so arranged that they begin or are traced to a common point.

Having fully described my invention, what I claim as new and desire to secure by Letters Patent, is:—

1. A transmission gearing comprising a driving gear and driven gears, each of the several gears having right and left threads, the diameter of the driving-gear being equal to the sum of the diameters of the driven gears on any plane at right-angles to their axes, the number of threads on the driving-gear being equal to the sum of the number of threads on the driven gears.

2. A transmission gearing comprising a driving gear and driven gears, each of the several gears having right and left threads with a groove around the axis of said gears between the right and left threads, the diameter of the driving-gear being equal to the sum of the diameters of the driven gears on any plane at right angles to their axes, the number of threads on the driving gear being equal to the sum of the number of threads on the driven gears.

In testimony whereof I affix my signature, in the presence of two witnesses.

JOHN G. FAUST.

Witnesses:
 MARGARET R. WILSON,
 HARRY C. MANNS.